US011442561B2

(12) United States Patent
Wu

(10) Patent No.: US 11,442,561 B2
(45) Date of Patent: Sep. 13, 2022

(54) MULTI-PURPOSE AUXILIARY DEVICE

(71) Applicant: Jung Wu, Taipei (TW)

(72) Inventor: Jung Wu, Taipei (TW)

( * ) Notice: Subject to any disclaimer, the term of this patent is extended or adjusted under 35 U.S.C. 154(b) by 0 days.

(21) Appl. No.: 17/515,588

(22) Filed: Nov. 1, 2021

(65) Prior Publication Data

US 2022/0137730 A1 May 5, 2022

(30) Foreign Application Priority Data

Nov. 3, 2020 (TW) .................................. 109214522

(51) Int. Cl.
*G06F 3/0354* (2013.01)
*G06F 3/044* (2006.01)

(52) U.S. Cl.
CPC .......... *G06F 3/03545* (2013.01); *G06F 3/044* (2013.01)

(58) Field of Classification Search
CPC ............................. G06F 3/03545; G06F 3/044
See application file for complete search history.

(56) References Cited

U.S. PATENT DOCUMENTS

| | | | | |
|---|---|---|---|---|
| 5,882,667 A | * | 3/1999 | Jones | A01N 25/34 424/405 |
| 8,994,699 B2 | * | 3/2015 | Jung | G06F 3/03545 345/173 |
| 11,243,621 B1 | * | 2/2022 | Vass | A01N 25/34 424/405 |
| 2004/0085286 A1 | * | 5/2004 | Wang | G06F 3/03545 345/156 |
| 2004/0136083 A1 | * | 7/2004 | Wang | G06F 3/03545 359/642 |
| 2004/0140964 A1 | * | 7/2004 | Wang | G06F 3/03545 345/179 |
| 2004/0140965 A1 | * | 7/2004 | Wang | G06F 3/03545 345/179 |
| 2012/0086664 A1 | * | 4/2012 | Leto | B43K 8/003 345/173 |
| 2015/0022503 A1 | * | 1/2015 | Chang | B43K 23/12 345/179 |
| 2022/0027002 A1 | * | 1/2022 | Vass | G06F 3/044 |

FOREIGN PATENT DOCUMENTS

WO  WO-2011008533 A2 * 1/2011 .......... B43K 21/006

\* cited by examiner

*Primary Examiner* — Michael Pervan

(57) ABSTRACT

A multi-purpose auxiliary device includes: a first body having a holding portion and docking portion, a second body combined with the first body, and a round head kit sleeved on the first body. The docking portion has a semi-spherical enlarged portion having configurations for key operations. When the round head kit is sleeved on the center pillar of the enlarged portion, the first body serves as a capacitive stylus for operating an LCD monitor. When the round head kit is not sleeved on the center pillar, the first body serves as a resistive stylus for operating the LCD monitor, or serves as an electronic credit card signature by using an edge of the holding portion, thus providing versatility and frequency of use for the auxiliary device, and preventing effects of dirt or germs on hands.

10 Claims, 6 Drawing Sheets

MULTI-PURPOSE AUXILIARY DEVICE

BACKGROUND OF INVENTION

1. Field of Invention

The present disclosure relates to an auxiliary device, and more particularly, to a portable and multi-purpose auxiliary device, which can prevent hands from directly touching the buttons that need to be pressed when operating. The auxiliary device provide by the present disclosure may also have a capacitive or resistive LCD monitor, or compatible with the electronic credit card signature.

2. Related Art

Since the outbreak of SARS (atypical pneumonia) arose in Guangzhou, mainland China in 2002, which caused a near worldwide infection, many people have paid extra attention to public health safety. In addition, after experiencing the recent spread of Covid-19 as a pandemic all over the world, medical experts vigorously advocated and promoted for wearing a mask once one has fever or illness in order to avoid spreading germs to others. As for healthy people, the medical experts recommended to wash hands frequently, spray alcohol or dry hands, etc., to maintain cleanliness and hygiene to avoid contact with germs (referring to infectious bacteria, molds, fungi, viruses, etc., hereinafter referred to as germs), thus preventing from infections.

However, it could be fairly difficult to maintain personal cleanliness and hygiene in some public places. For example, when one takes an elevator and press a button for selecting a destined floor, or presses buttons to enter the password to withdraw cash from an ATM, it is easy to come into contact with the germs that have been attached to the buttons. Without a timely hand wash or spraying with alcohol, it is easy to get infected by touching one's mouth, nose and eyes through one's hands.

Although a conventional auxiliary device has been developed on the market that forbid hands from directly touching buttons, the functionality thereof is fairly monotonous, and has no other usage except for the auxiliary pressing function. Aiming at the popularity of 3C portable products, how to provide functions such as portability and easy access to 3C products for the auxiliary device so that versatility can be reached is an issue to be solved when anti-pandemic products come to mind. The inventor of this disclosure has actively researched how to provide the auxiliary device with multiple usages for preventing the pandemic, so as to increase the frequency of use.

SUMMARY OF INVENTION

Therefore, the main objective of the present disclosure is to provide a multi-purpose auxiliary device, which is convenient to carry and easy to use, and can provide alternative tools for various key operations. In addition, the present disclosure also allows for operating an LCD monitor in a capacitive or resistive manner, or allows for the use of an electronic credit card signature, thus providing versatility and increasing frequency of use for the auxiliary device, and preventing effects of dirt or germs on hands.

To reach the above objective, the present disclosure provides a multi-purpose auxiliary device that comprises a first body, a second body, and a round head kit. The first body has a holding portion and a docking portion, and a cone-shaped center pillar protrudes outwardly from a surface of the docking portion, and a head of the center pillar has a semi-spherical enlarged portion for pressing objects. The second body has an opening, and the second body has accommodating space inside that is connected to the opening for accommodating the center pillar, wherein the periphery of the opening extends inwardly with a fastener, to be combined with the first body. The round head kit has sleeve opening that can be sleeved on the semi-spherical enlarged portion of the first body. Configurations of the semi-spherical enlarged portion of the first body is provided for a plurality types of key operations, and when the round head kit is sleeved on the enlarged portion of the center pillar of the first body, the first body serves as a capacitive stylus for operating an LCD monitor; and when the round head kit is not sleeved on the enlarged portion of the center pillar of the first body, the first body serves as a resistive stylus for operating the LCD monitor, or serves as an electronic credit card signature by using an edge of the holding portion, thus providing versatility and frequency of use for the auxiliary device, and preventing effects of dirt or germs on hands.

Accordingly, an embodiment is characterized in that a side wall of the center pillar of the first body is provided with a first convex ring; the fastener of the second body has barb slope, two ends of the barb slope respectively abut between a lower edge of the first convex ring on the side wall of the center pillar of the first body and a docking surface of the center pillar, so as to be combined with the first body.

Accordingly, an embodiment is characterized in that a second convex ring is provided on a side wall of the center pillar of the first body, a partial surface of an inner edge of the sleeve opening of the round head kit extends zigzag toward the center of the sleeve opening to form a containing groove for containing a second convex ring of the first body, so as to be combined with the first body.

Accordingly, an embodiment is characterized in that, the second body is provided with a perforation, to function as a sling for the auxiliary device to be hung and worn or to be used in tandem with a key ring.

BRIEF DESCRIPTION OF DRAWINGS

To describe the technical solutions in the embodiments of the present invention, the following briefly introduces the accompanying drawings for describing the embodiments. Apparently, the accompanying drawings in the following description merely show some embodiments of the present invention, and a person skilled in the art may still derive other drawings from these accompanying drawings without creative efforts.

DESCRIPTION OF PREFERRED EMBODIMENTS

Figure 1:
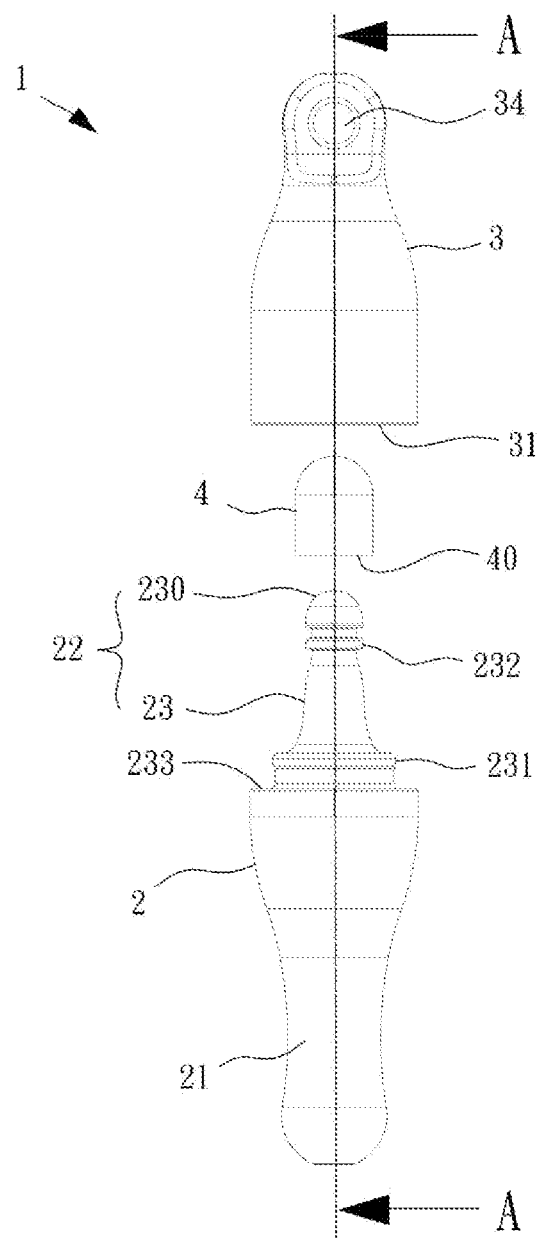
FIG. 1 is a diagram illustrating an exploded view of the present disclosure multi-purpose auxiliary device.
Figure 2:
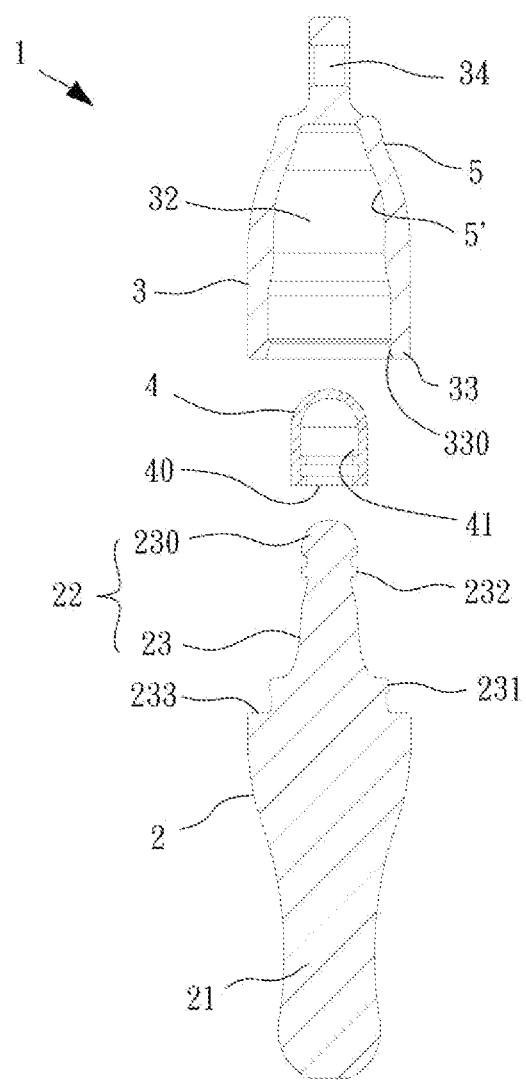
FIG. 2 is a diagram illustrating a cross-sectional exploded view along the line A-A in FIG. 1.
Figure 3:
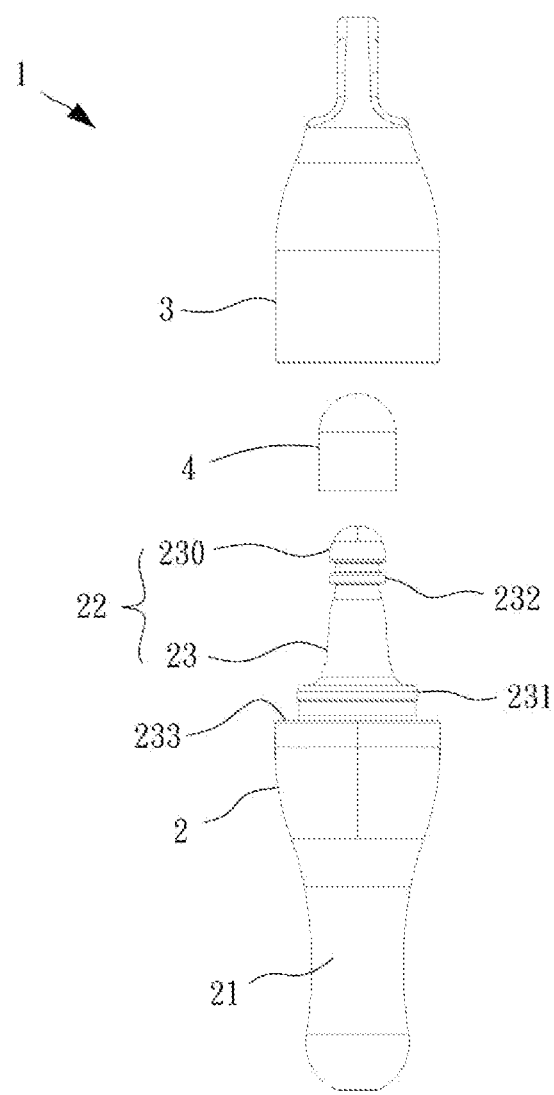
FIG. 3 is a diagram illustrating an exploded view from another perspective of FIG. 1.
Figure 4:
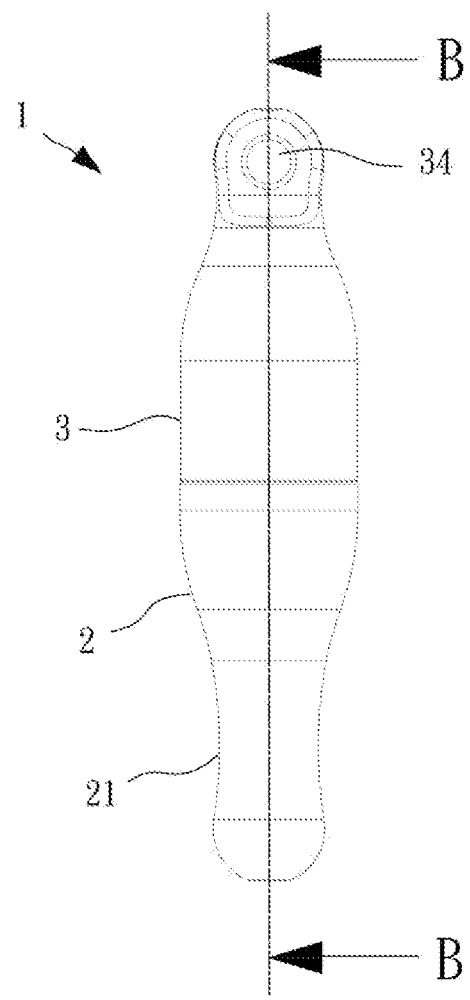
FIG. 4 is a diagram illustrating a combined view according to FIG. 1.
Figure 5:
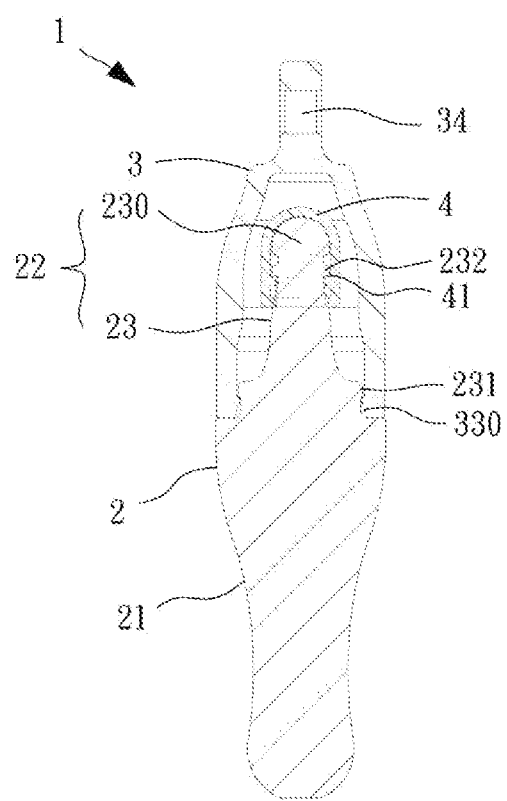
FIG. 5 is a diagram illustrating a sectional combined view along the line B-B in FIG. 4.
Figure 6:
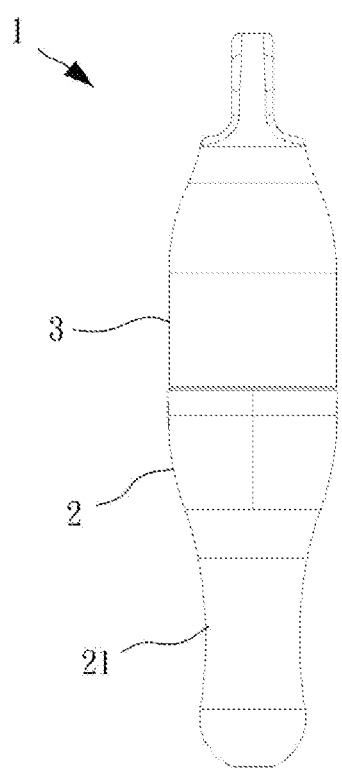
FIG. 6 is a diagram illustrating a sectional combined view according to another perspective of FIG. 4.

Please refer to FIG. 1 to FIG. 6 depicting various aspects of the multi-purpose auxiliary device provided by the present disclosure. As shown in the figures, the auxiliary device 1 comprises a first body 2, a second body 3 and a round head kit 4. The combination of the first body 2 and the second body 3 can adopt regular or irregular geometric shapes, or cartoon shapes. This embodiment adopts irregular geometric shapes, and the material thereof is selected as carbon fiber, wherein the first body 2 has a holding portion 21 and a docking portion 22. The holding portion 21 is formed by the first body 2 into an oblong shape suitable for hand holding, and the cone-shaped center pillar 23 of the docking portion 22 is protruded outwardly from the surface. The head of the center pillar 23 has a semi-spherical enlarged portion 230, which facilitates in pressing objects. A first convex ring 231 and a second convex ring 232 are provided on the side wall of the center pillar 23, so as to be respectively be combined with the second body 3 and the round head kit 4. The details thereof are later described in this application.

The second body 3 is also made of carbon fiber, and its outline is mostly similar to the aforementioned first body 2 and has an opening 31. The second body 3 has an accommodating space 32 inside, which is connected to the opening 31 for accommodating the center pillar 23 (see FIG. 2). The periphery of the opening 31 extends inwardly with fastener 33, the fastener 33 has a barb slope 330, and the two ends of the barb slope 330 respectively abut against the lower edge of the first convex ring 231 on the side wall of the center pillar 23 of the first body 2 and abut between the center pillar 23 and the docking surface 233, so as to be combined with the first body 2. Moreover, the second body 3 is provided with a perforation 34, to function as a sling for the auxiliary device 1 to be hung and worn or to be used in tandem with a key ring. Furthermore, the first body 2 and second body 3 are pre-injected into the material of carbon fiber in proportion to the nanocomposite JM-TTA antibacterial fiber material before injection molding, thus providing the first body 2 and the second body 3 with a self-cleaning, high temperature resistive, antibacterial and antiviral protection layer.

The round head kit 4 (see FIG. 2) is mode of rubber, and sleeved on the semi-spherical enlarged portion 230. The round head kit 4 has a sleeve opening 40, and a partial surface of the inner edge of the sleeve opening 40 extends zigzag toward the center of the sleeve opening 40 to form a containing groove 41 for containing a second convex ring 232 of the first body 2, so as to be combined with the first body 2.

When the multi-purpose auxiliary device 1 of the present disclosure (see FIG. 5 and FIG. 6) is used, the material of the semi-spherical enlarged portion 230 of the first body 2 is strong enough and pressure resistant, and the structure thereof is also beneficial to concentration of pressing points, and is suitable for various types of key operations. In addition, when the round head kit 4 is sleeved on the enlarged portion 230 on the center pillar 23 of the first body 2, the first body 2 serves as a capacitive stylus for operating an LCD monitor. When the round head kit 4 is not sleeved on the enlarged portion 230 on the center pillar 23 of the first body 2, since the semi-spherical enlarged portion 230 is made of carbon fiber, the first body can be provided as a resistive stylus for operating the LCD monitor (Note: considering the capacitive touch screens are mostly used nowadays, the round head kit 4 can also be fixed by glue, and is exclusively used for a capacitive stylus). Further, the edge of the holding portion 21 may be used as an electronic credit card signature. In addition, the first body 2 and second body 3 have the nanocomposite JM-TTA antibacterial fiber material as a protection layer, thus providing the self-cleaning, high temperature resistive, antibacterial and antiviral effects. Moreover, the second body 3 of the present disclosure provides the perforation 34 so that the auxiliary device 1 can be used with a sling, thus providing the characteristic of portability. As can be seen from the above, the auxiliary device 1 of the present disclosure can thus provide versatility and increase the frequency of use, and achieve multiple effects that truly prevent effects of dirt or germs on hands.

To summarize, the multi-purpose auxiliary device of the present disclosure does meet the requirements of patentable elements, and is filed in accordance with Patent Act. However, the above is only preferred embodiments of the present disclosure, and is not meant to be used to limit the claimed scope of the present disclosure. Hence, all the equivalent changes and modifications of the shape, structure, characteristics, and spirit based on claims of the present disclosure shall fall in the scope of the claims of the present disclosure.

What is claimed is:

1. A multi-purpose auxiliary device comprising a first body, a second body, and a round head kit, wherein:
    the first body has a holding portion and a docking portion, and a cone-shaped center pillar protrudes outwardly from a surface of the docking portion, and a head of the center pillar has a semi-spherical enlarged portion for pressing objects;
    the second body has an opening, and the second body has accommodating space inside that is connected to the opening for accommodating the center pillar, wherein the periphery of the opening extends inwardly with a fastener, so as to be combined with the first body;
    the round head kit has sleeve opening that can be sleeved on the semi-spherical enlarged portion of the first body; and
    configuration of the semi-spherical enlarged portion of the first body is provided for a plurality types of key operations, and when the round head kit is sleeved on the enlarged portion of the center pillar of the first body, the first body serves as a capacitive stylus for operating an LCD monitor; and when the round head kit is not sleeved on the enlarged portion of the center pillar of the first body, the first body serves as a resistive stylus for operating the LCD monitor, or serves as an electronic credit card signature by using an edge of the holding portion, thus providing versatility and frequency of use for the auxiliary device, and preventing effects of dirt or germs on hands.

2. The multi-purpose auxiliary device according to claim 1, wherein a side wall of the center pillar of the first body is provided with a first convex ring, the fastener of the second body has barb slope, and two ends of the barb slope respectively abut between a lower edge of the first convex ring on the side wall of the center pillar of the first body and a docking surface of the center pillar, so as to be combined with the first body.

3. The multi-purpose auxiliary device according to claim 1, wherein a second convex ring is provided on a side wall of the center pillar of the first body, and a partial surface of an inner edge of the sleeve opening of the round head kit extends zigzag toward the center of the sleeve opening to form a containing groove for containing a second convex ring of the first body, so as to be combined with the first body.

4. The multi-purpose auxiliary device according to claim 1, wherein the second body is provided with a perforation, to function as a sling for the auxiliary device to be hung and worn or to be used in tandem with a key ring.

5. The multi-purpose auxiliary device according to claim 1, wherein a combination of the first body and the second body is of a regular or irregular geometric shape or a cartoon shape.

6. The multi-purpose auxiliary device according to claim 1, wherein the first body and the second body are made of carbon fiber, and the round head kit is made of rubber.

7. The multi-purpose auxiliary device according to claim 6, wherein the first body and second body are pre-injected into the material of carbon fiber in proportion to the nanocomposite JM-TTA antibacterial fiber material before injection molding, thus providing the first body and the second body with a self-cleaning, high temperature resistive, antibacterial and antiviral protection layer.

8. The multi-purpose auxiliary device according to claim 1, wherein the holding portion is formed by the first body into an oblong shape suitable for hand holding.

9. The multi-purpose auxiliary device according to claim 1, wherein the round head kit is further fixed by glue and is exclusively used for a capacitive stylus.

10. A multi-purpose auxiliary device, comprising:
a first body and a second body mixed with carbon fiber and nanocomposite JM-TTA antibacterial fiber material, wherein:
the first body at least has a holding portion and a docking portion, and a cone-shaped center pillar protrudes outwardly from a surface of the docking portion, and a head of the center pillar has a semi-spherical enlarged portion for pressing objects; and
the second body has an opening, and the second body has accommodating space inside that is connected to the opening for accommodating the center pillar, and for the second body to combined with the first body; and
a round head kit has a sleeve opening that can be sleeved on the semi-spherical enlarged portion of the first body.

* * * * *